June 1, 1926.

G. E. PETERSEN 1,587,351

AUTOMATIC CONTROL MECHANISM FOR RADIATOR SHUTTERS

Filed March 3, 1925　　4 Sheets-Sheet 2

ON LINE 2-2. FIG. 3.

ON LINE 3-3. FIG. 2.

Inventor
George E. Petersen.
By Robert M. Barr
Attorney

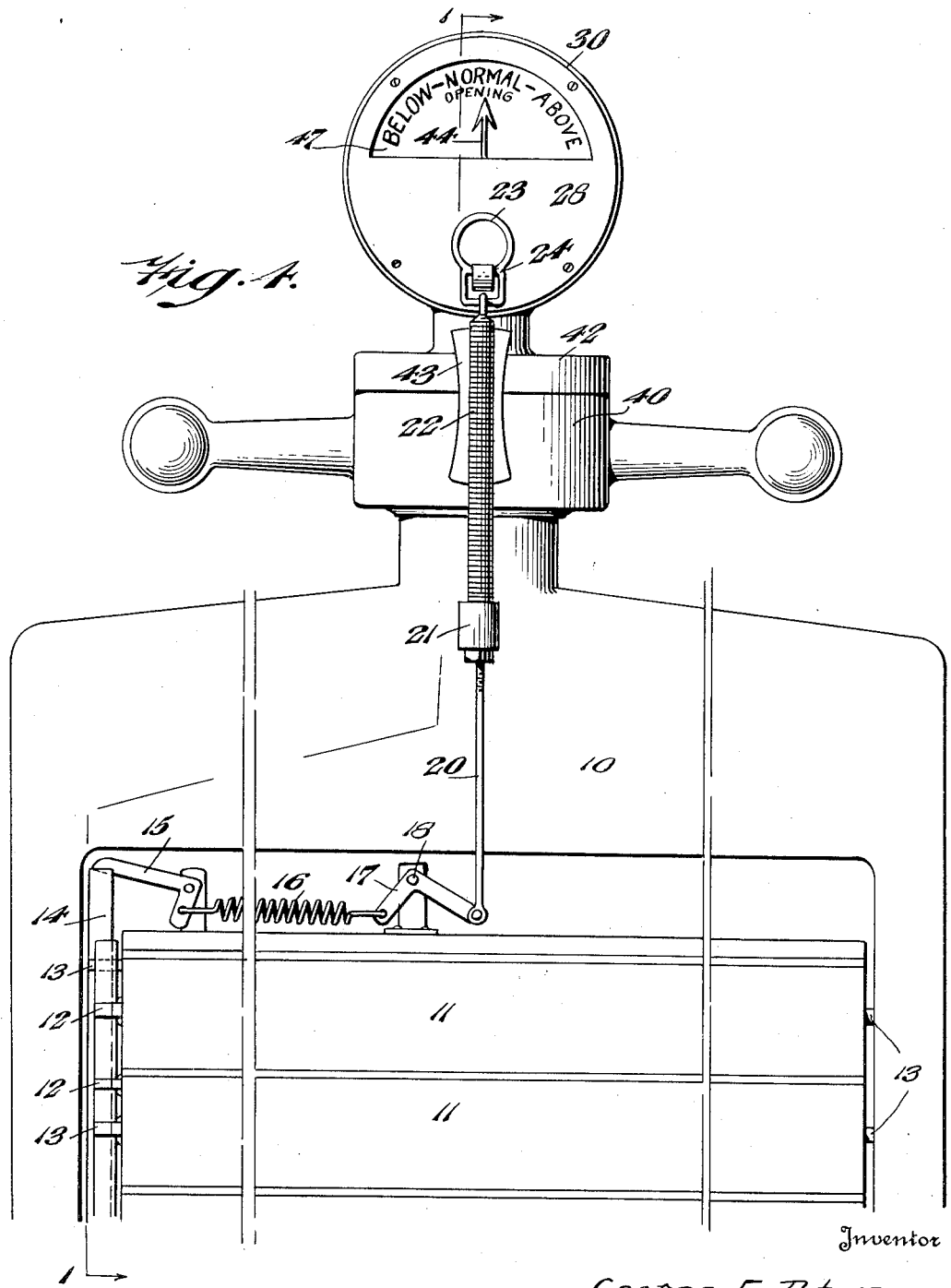

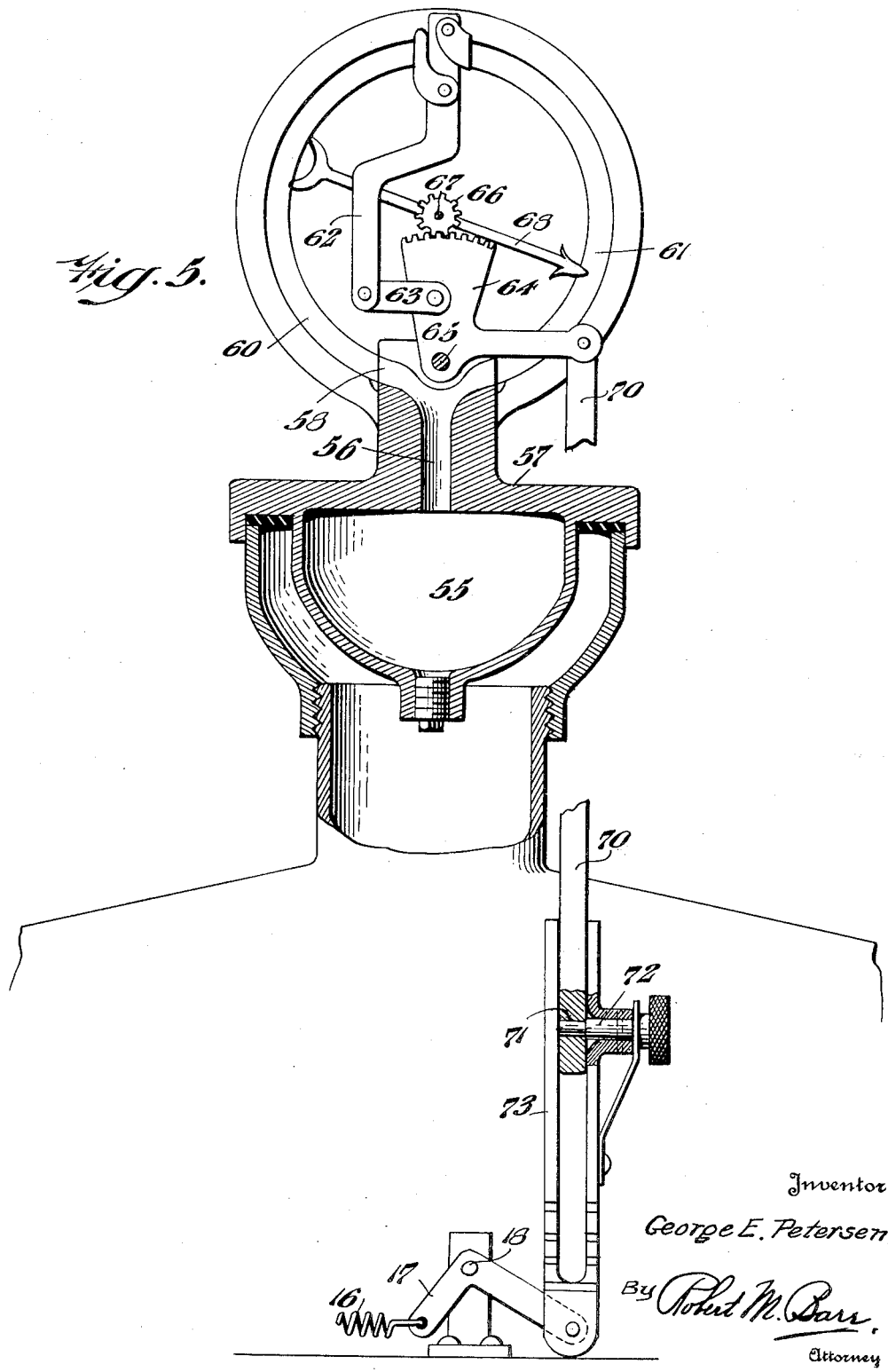

Patented June 1, 1926.  1,587,351

UNITED STATES PATENT OFFICE.

GEORGE E. PETERSEN, OF BRISTOL, PENNSYLVANIA.

AUTOMATIC CONTROL MECHANISM FOR RADIATOR SHUTTERS.

Application filed March 3, 1925. Serial No. 12,988.

The present invention relates to radiators of automobiles or motor vehicles generally, and more particularly to an automatic control for shutters regulating the amount of air passing through the radiator.

Some of the objects of the present invention are to provide an improved shutter operating means for radiators cooled by the passage of air therethrough; to provide an improved control means for shutters whereby the shutters are controlled and adjusted by temperature variations in the radiator; to provide an improved thermostatic control for radiator shutters; to provide means automatically operated whereby the position of the radiator shutters of an automobile is indicated to the operator of the automobile; to provide thermostatic means for simultaneously operating the shutters of a radiator and giving an indication corresponding to the position taken by such shutters; and to provide other improvements as will hereinafter appear.

Figure 1:
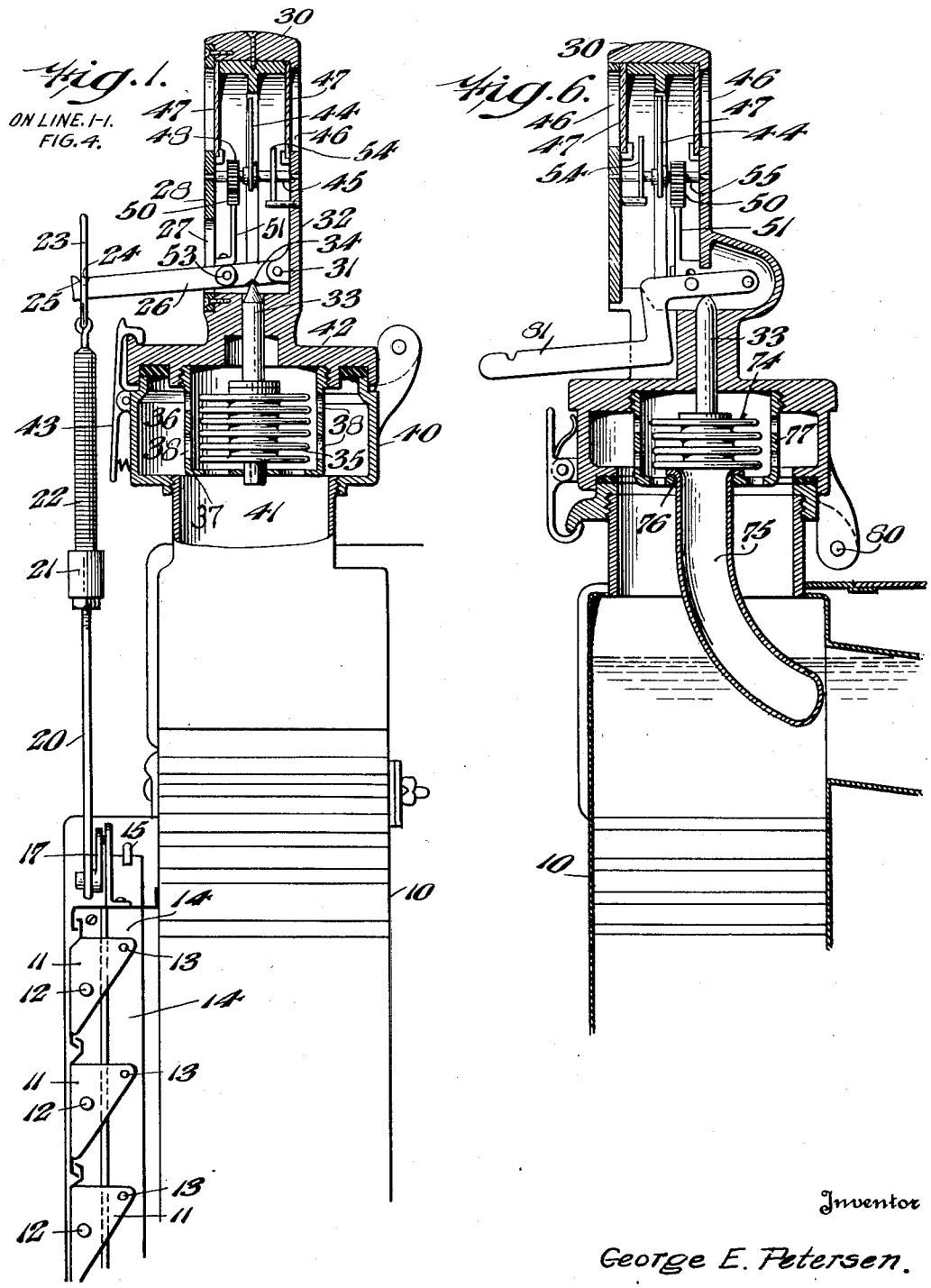
Figure 2:
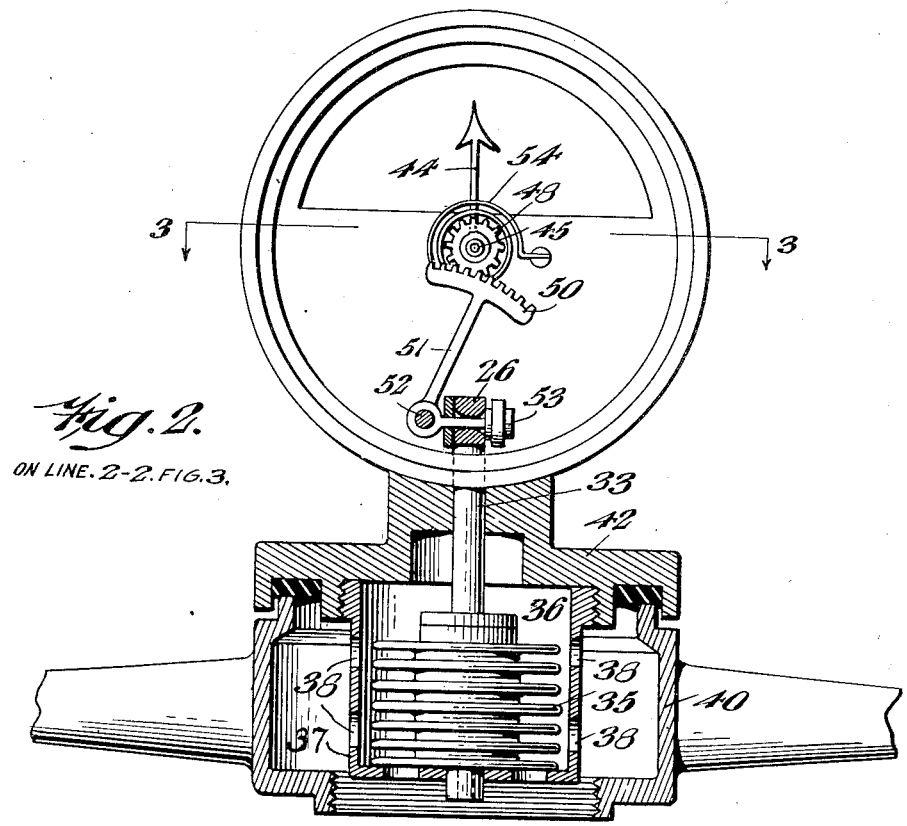
Figure 3:
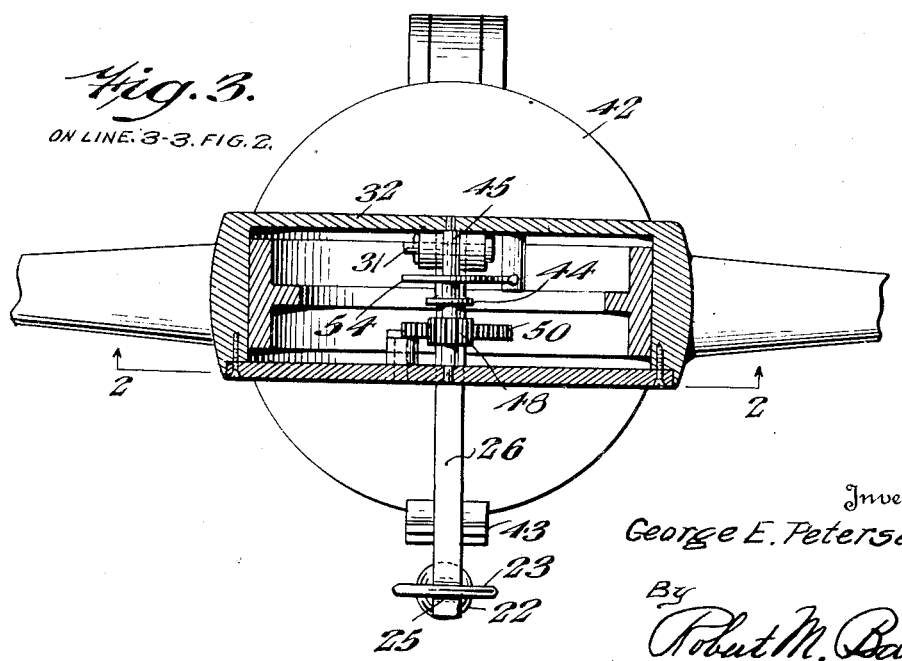

In the accompanying drawings Fig. 1 represents a sectional elevation of a shutter control mechanism for motor vehicle radiators embodying one form of the present invention attached in operative position upon such radiator; Fig. 2 represents a section of the mechanism taken on line 2—2 of Fig. 1; Fig. 3 represents a section on line 3—3 of Fig. 2; Fig. 4 represents a front elevation of Fig. 1; Fig. 5 represents a sectional front elevation of another form of the mechanism; and Fig. 6 represents a sectional elevation of another embodiment of the invention.

Referring to the drawings, one form of the present invention is shown in Figs. 1 to 4 inclusive and is shown as applied to an automobile radiator 10, of the cooling system, having a plurality of shutters 11 arranged on the front thereof for the purpose of regulating or entirely cutting off the supply of air to the radiator. A typical shutter arrangement is here shown wherein the respective shutters 11 are mounted on pivots 12 and connected by rigid pins 13 with a common operating upwardly spring pressed bar 14 which extends transversely of the shutters at one end so that movement of the bar 14 downwardly causes the shutters to swing on their respective pivots to open position, and movement of the rod 14 upwardly causes the shutters to swing to closed position.

For the purpose of actuating the bar 14 a pivoted bell crank 15 is provided having its long arm in this instance abutting the bar 14 and its short arm connected by a spring 16 with one arm of a second bell crank 17 pivoted at 18 to a fixed part and having its other arm connected to an operating rod 20 which extends substantially vertically upward just in front of the radiator. The upper end of the rod 20 has threaded engagement with a coupling 21 which is connected to one end of a coil spring 22, having its other end joined to a link 23, a retaining cross-piece 24 of which seats in a recess 25 of an actuating lever 26. This lever 26 projects through a slot 27 in the front wall or plate 28 of an instrument case 30, and is pivoted at 31 to the rear inner wall 32 of the case 30.

In order to transmit motion to the lever 26, a movable plunger 33 is provided having a knife edge seating in a notch 34 in the bottom of the lever 26 and forming an extension of the movable element 35 of the thermostat 36. While the thermostat 36 may be of any standard type, the preferred is that shown wherein the movable element 35 is formed as a hollow member having a plurality of corrugations and is filled with a suitable expansible medium readily influenced by temperature variations. The fixed part of the thermostat is in the form of a cage 37 having openings 38 for the free circulation of the medium or vapor thereof whose temperature is controlling. In the present construction the thermostat 36 is located in a cap 40, which is arranged to be attached to and fit over the filling opening 41 for the radiator, and permits access thereto by having a hinged cover 42 from the inner face of which the thermostat 36 depends within the cap 40. As here shown the cover 42 is formed integral with the instrument case 30 and is suitably apertured to form a snug sliding fit for the plunger 33, which protrudes to engage the lever 26. A spring controlled latch 43 serves to lock the cover 42 in its closed position.

As a means for indicating the position of the shutters 11 to the operator of the vehicle, that is to provide a visible device by which it can be told at a glance whether the shutters are open, closed, or are functioning in the proper manner, the wall 32 has an index or pointer 44 rigidly secured to a staff 45 which has its ends journalled respectively in opposite walls of the case 32. Openings 46 closed by a glass or other transparent medium 47 permit the pointer 46 to be seen as required for indicating purposes. Motion is transmitted to the pointer 44 in accordance with temperature variations in the water or vapor space of the radiator by a pinion 48 fast to the staff 45 and in mesh with a toothed segment 50 carried by a lever 51 which is pivoted at 52 and has its opposite end secured by a suitable fastening device 53 to the lever 26. A spiral spring 54 is fast at one end to the staff 45 and at its other end to the case 32 so that it normally holds the pointer 44 toward the side of the instrument corresponding to the closed position of the shutters 11, and opposes the forces acting to move the pointer counter-clockwise as seen in Fig. 2.

In the form of the invention shown in Fig. 5, a thermostat 55 of bulb form is employed having a conduit 56 leading therefrom by way of the cap cover 57 to a two-way outlet 58 communicating respectively with two flexible tubes 60 and 61. The ends of these tubes are closed and are connected respectively to a movement multiplying lever 62 which is connected by a link 63 with a gear segment bell crank 64 having a fulcrum 65 on the cap 57. The segment arm of the bell crank 64 is in mesh with a pinion 66 on the staff 67 of the pointer or index 68 and the other arm of the bell crank is connected to an operating rod 70 by which the shutters are moved in a manner proportioned to the controlling temperature. As here shown the operating rod 70 is detachably connected with the shutter mechanism by providing a transverse hole 71 in its free end for engagement with a spring pressed locking pin 72 operating through the wall of a sleeve 73 which receives the end of the rod 70. The sleeve 73 is connected to the bell crank 17 whereby motion is transmitted to the shutters. The operation of this form of the invention takes place by the expansion of the flexible tubes 60 and 61 as influenced by the pressure developed by the oil, alcohol, or other heat sensitive liquid contained within the bulb 55 and the tubes 60 and 61. In a device of the present character it is desirable to employ a liquid having a boiling point below that of the liquid used as a cooling medium in the radiator, as thereby the shutters are caused to open well before a condition of danger arises.

In the form of the invention shown in Fig. 6, the modification resides more particularly in the thermal responsive means, and hence those parts which conform to the description of Figs. 1 to 4 are identified by the same numerals for like parts. In this form the movable corrugated element 74 of the thermostat is provided with a tubular extension 75 which extends downward through an aperture 76, provided in the fixed cage 77 of the thermostat, for such a distance as will insure its lower end being immersed in the cooling liquid in the radiator. This extension tube 75 is of relatively flat section in order to obstruct as little as possible the filling spout, and where the cover is hinged it is curved on an arc having the pivot point 80 as a center. This construction, together with placing the hinge point low, allows the tube 75 to swing clear of the spout when the cover is opened for filling purposes. In this construction the lever 81 is bent downward and then outward to closely follow the contour of the cap closure and be rendered relatively inconspicuous while effectively transmitting motion to the shutter control levers.

The operation of the control mechanism is as follows: The tension of the spring 22 is first adjusted so that the added pull transmitted by the movement of the lever 26 will cause a direct opening pull on the shutters instead of merely a stretching of the spring. When the engine is not running, the movable element 35 of the thermostat is in its contracted position, and consequently the lever 26 is in its lowermost position and the shutters 11 are closed. Upon the starting of the engine, the shutters are not immediately opened because the circulating medium is still relatively cool and the engine reaches its efficient running condition more quickly by maintaining the shutters closed during this initial period, but as soon however as the circulating medium heats up sufficiently to affect the thermostat, the movable element 35 thereof expands upwardly. This expansion raises the plunger 33 so that it in turn swings the lever 26 clockwise as seen in Fig. 1 so that the rod 20 is pulled upward and its motion correctly transmitted to the shutters, which thereupon swing to an open position and allow the cool air to pass through the radiator. Incidental to this opening of the shutters the lever 26 causes the segment 50 to rock and thereby turn the staff 45 so that the index or pointer 44 is moved to indicate on the instrument that the shutters have opened.

In the form of the invention shown in Figs. 1 to 4 inclusive, the thermostat is so located as to be directly influenced by the temperature of the circulating medium within the radiator, either by direct contact with such medium or in such close proximity thereto as to be effectively exposed to the vapor from the heated medium. In the forms of the invention shown in Figs. 1, 2, 3 and 6, the thermostat acts mechanically through a movable plunger to operate the shutter mechanism, while in the form of the invention shown in Fig. 5 the thermostat acts through the movement of a Bourdon tube to cause the proper functioning of the shutter operating mechanism, though the general broad result is the same, namely, utilizing the temperature of the circulating medium of the engine for automatically controlling the opening and closing of the shutters which regulate the supply of air through the radiator.

It should be noted that the expansible member or thermostatic element is filled with a temperature responsive medium the characteristics of which are such that it expands gradually up to a temperature of say 180° F. and at that temperature its casing abuts the bottom of the cap and no further expansion or action on the indicator can take place. Thus for example when the vapor of the water changes into a steam condition the indicator has already reached its limit of movement and there is no further movement of it. This construction avoids any sudden jump of the indicator caused by the quick variation of temperature when the vapor changes to steam and gives a reliable indication of what is taking place in the radiator space. In operation therefore an increase of temperature in the space above the water will expand the thermostat and gradually open the shutters and when the expansible medium is of such sensitivity that at 150° F. it has fully opened the shutters, the indicator points to normal opening position. If the vapor space continues to increase in temperature an expansion of the thermostatic element is still possible because the spring 22 yields and in this way the indicator can be swung to indicate the temperature is above normal while the shutters remain stationary in open position. When the arrow or pointer 44 has reached a position corresponding approximately to 180° the thermostatic element has reached its limit of motion by contact with the cap. Generally considered therefore the thermostatic element is adjusted and designed to have a responsive movement only to temperatures below the boiling point of water.

From the foregoing it will be apparent that a complete automatic shutter mechanism has been devised wherein positive operation of the shutters is obtained in accordance with variations in temperature within the radiator. Also the operating connections between the automatic control and the shutter operating means are such that disconnection can be readily made so that the shutters can be left entirely open or closed as desired irrespective of the aforesaid temperature conditions. This also affords a means for opening the filling spout to replenish the cooling medium, and in case of any necessary repairs to the thermostatic arrangement, the device can be removed and still give the protection of a hand controlled front. Another advantage of the invention is the ease with which the device can be adapted to existing hand operated radiator fronts of the shutter type, because the operating lever can be readily adapted for connection to the ordinary hand lever. It also affords a maximum unrestricted area of the radiator core for the circulation of air, making it unnecessary to remove the front during the summer months, giving the highest efficiency for the motor throughout the entire year, and also minimizing crank case dilution. Another advantage over existing radiator fronts is in the provision of an indicating device to eliminate all guesswork as to the position of the shutters, and by means of the visible pointer gives the operator of the vehicle the true position of the shutters at all times.

It should be noted that spring 22 in addition to transmitting the pull of the lever 26 acts as a safety device because it is free to expand after the shutters are closed. This prevents an excessive movement of the lever 26 breaking any of the connections between it and the shutters.

While but three forms are shown in which this invention may be embodied, it is to be understood that the invention is not limited to any specific construction, but might be applied to various forms without departing from the spirit of the invention or the scope of the appended claims.

Having thus described my invention, I claim:

1. In a shutter control mechanism, the combination of an automobile radiator, shutters for controlling the air to said radiator, a thermostat in said radiator exposed to the temperature of the space above the engine cooling medium, means for operating said shutters, and means actuated by said thermostat extending through the filling opening of said radiator for controlling said operating means.

2. In a shutter control mechanism, the combination of an automobile radiator having an opening therein, shutters for controlling the air to said radiator, a removable cap for closing said opening, a thermostat carried by said cap and located in said radiator to be exposed to the temperature of the space above the engine cooling medium, means for operating said shutters, and means passing through said cap and actuated by said thermostat for controlling said operating means.

3. In a shutter control mechanism, the combination of an automobile radiator having an opening therein, shutters for controlling the air to said radiator, a removable cap for closing said opening, a cage secured to the inner side of said cap, a thermostat supported in said cage and exposed to the temperature of the space above the engine cooling medium, a plunger attached to said thermostat and projecting from said cap, means for operating said shutters, and means actuated by said plunger for transmitting motion to said shutter operating means.

4. In a shutter control mechanism, the combination of an automobile radiator having a filling opening for the cooling medium, shutters for controlling the air to said radiator, a removable cap for closing said opening, a thermostat carried by said cap and located in said radiator to be exposed to the temperature of the space above said medium, means for operating said shutters, and means passing through said cap and actuated by said thermostat for controlling said operating means.

5. In a shutter control mechanism, the combination of an automobile radiator having a filling opening for the cooling medium, shutters for controlling the air to said radiator, a removable cap for closing said opening, a thermostat carried by said cap and located in said radiator to be exposed to the temperature of the space above said medium, means for operating said shutters, means actuated by said thermostat for controlling said operating means, and means interposed between said actuated means and said operating means to prevent an excessive force being applied to said operating means.

6. In a shutter control mechanism, the combination of an automobile radiator having a filling opening for the cooling medium, shutters for controlling the air to said radiator, a removable cap for closing said opening, a thermostat carried by said cap and located in said radiator to be exposed to the temperature of the space above said medium, means for operating said shutters, means actuated by said thermostat for controlling said operating means, and a spring interposed between said actuated means and said operating means to prevent an excessive force being applied to said operating means.

7. In a shutter control mechanism, the combination of an automobile radiator having an opening therein, shutters for controlling the air to said radiator, a removable cap for closing said opening, a cage secured to the inner side of said cap, a thermostat supported in said cage and exposed to the temperature of the space above the engine cooling medium, a plunger attached to said thermostat and projecting from said cap, means for operating said shutters, means actuated by said plunger for transmitting motion to said shutter operating means, and means to indicate the position of said shutters.

8. In a shutter control mechanism, the combination of an automobile radiator having a filling opening for the cooling medium, shutters for controlling the air to said radiator, a removable cap for closing said opening, a thermostat comprising a corrugated expansible member having a temperature responsive medium sealed therein, a cage supporting said thermostat from said cap in position to be subject to variations in temperature of said cooling medium, means for operating said shutters, and means controlled by said thermostat for actuating said operating means.

9. In a shutter control mechanism, the combination of an automobile radiator having a filling opening for the cooling medium, shutters for controlling the air to said radiator, a removable cap for closing said opening, a thermostat comprising an expansible member having a temperature responsive medium sealed therein, a cage supporting said thermostat from said cap in position to be subject to variations in temperature of said cooling medium, means for operating said shutters, and means controlled by said thermostat for actuating said operating means.

10. In a shutter control mechanism, the combination of an automobile radiator having a filling opening for the cooling medium, shutters for controlling the air to said radiator, a removable cap for closing said opening, a thermostat comprising a corrugated expansible member having a temperature responsive medium sealed therein, a cage supporting said thermostat from said cap in position to be subject to variations in temperature of said cooling medium, means for operating said shutters, and means including a plunger protruding from said cap and controlled by said thermostat for actuating said operating means.

11. In a shutter control mechanism, the combination of an automobile radiator having a filling opening for the cooling medium, shutters for controlling the air to said radiator, a removable cap for closing said opening, a thermostat comprising a corrugated expansible member having a temperature responsive medium sealed therein, a cage supporting said thermostat from said cap in position to be subject to variations in temperature of said cooling medium, means for operating said shutters, and means including a spring connection controlled by said thermostat for actuating said operating means.

12. In a shutter control mechanism, the combination of an automobile radiator having a filling opening for the cooling medium, shutters for controlling the air to said radiator, a cap pivoted to open and close said filling opening, a thermostat comprising an expansible member having a depending tube integral therewith, said member and tube having a temperature responsive medium sealed therein, means to support said thermostat within said radiator below said cap with said tube immersed in the cooling fluid, means for operating said shutters, and means controlled by said thermostat for actuating said operating means.

13. In a shutter control mechanism, the combination of an automobile radiator having a filling opening for the cooling medium, shutters for controlling the air to said radiator, a cap pivoted to open and close said filling opening, a thermostat carried by said cap comprising an expansible member having a tube depending therefrom, said tube being curved to pass freely through said opening when said cap is opened, a temperature responsive medium sealed in said thermostat and tube, means for operating said shutters, and means controlled by said thermostat for actuating said operating means.

14. In a shutter control mechanism, the combination of an automobile radiator having a filling opening for the cooling medium, shutters for controlling the air to said radiator, a cap pivoted to open and close said filling opening, a thermostat comprising an expansible member having a depending tube integral therewith, said member and tube having a temperature responsive medium sealed therein, means to support said thermostat within said radiator below said cap with said tube immersed in the cooling fluid, means for operating said shutters, means controlled by said thermostat for actuating said operating means, and means also controlled by said thermostat for indicating the position of said shutters.

15. In a shutter control mechanism, the combination of an automobile radiator having a filling opening for the cooling medium, shutters for controlling the air to said radiator, a cap pivoted to open and close said filling opening, a thermostat carried by said cap comprising an expansible member having a tube depending therefrom, said tube being curved to pass freely through said opening when said cap is opened, a temperature responsive medium sealed in said thermostat and tube, means for operating said shutters, means controlled by said thermostat for actuating said operating means, and means also controlled by said thermostat for indicating the position of said shutters.

16. In a shutter control mechanism, the combination of an automobile radiator having an opening therein, shutters for controlling the air to said radiator, a removable cap for closing said opening, means for operating said shutters, an indicating instrument mounted on the outside of said cap, a thermostat mounted on the inside of said cap and exposed to the temperature along the surface of the engine cooling medium, and common means controlled by said thermostat for simultaneously actuating said operating means and setting said indicating instrument.

17. In a shutter control mechanism, the combination of an automobile radiator having a filling opening for the cooling medium, shutters for controlling the air to said radiator, a removable cap for closing said opening, a thermostat comprising an expansible member having a temperature responsive medium sealed therein, a cage supporting said thermostat from said cap in position to be subject to variations in temperature of said cooling medium, means for operating said shutters, means controlled by said thermostat for actuating said operating means, and means for disconnecting said actuating means from said operating means.

18. In a shutter control mechanism, the combination of an automobile radiator, shutters for controlling the air to said radiator, a thermostat exposed to the temperature in said radiator above the water space, means actuated by said thermostat for controlling said shutters, a device for indicating the position of said shutters and the temperature of the space above the water in the radiator, separate means controlled by said thermostat for operating said indicator, and means whereby said indicator is actuated by said thermostat independently of said shutters.

19. In a shutter control mechanism, the combination of an automobile radiator, shutters for controlling the air to said radiator, a device for indicating shutter and temperature conditions, a thermostat, and means controlled by said thermostat for operating said shutters and indicator simultaneously until a predetermined temperature is reached and operating only said indicator between such temperature and a temperature below the boiling point of water.

Signed at Philadelphia, county of Philadelphia, State of Pennsylvania, this 28th day of February, 1925.

GEORGE E. PETERSEN.